B. Cushwa,
Circular Saw Mill.
N° 1,691.  Patented July 15, 1840.
2 Sheets. Sheet 2.
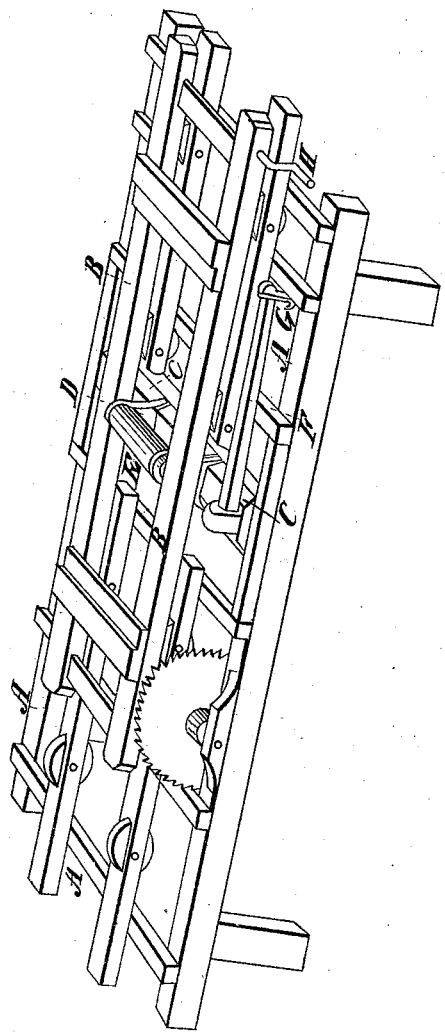

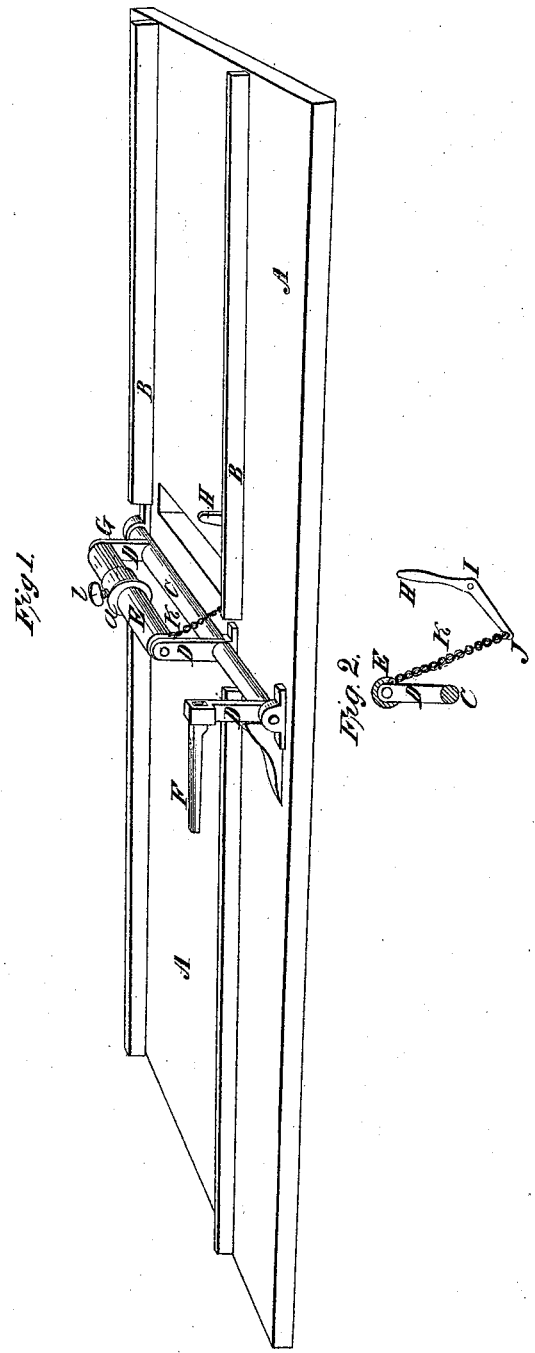

UNITED STATES PATENT OFFICE.

BENJAMIN CUSHWA, OF CLEAR SPRING, MARYLAND.

SELF-ADJUSTING LOG-BRACE FOR SAWMILLS.

Specification of Letters Patent No. 1,691, dated July 15, 1840.

*To all whom it may concern:*

Be it known that I, BENJAMIN CUSHWA, of Clear Spring, in the county of Washington and State of Maryland, have invented an improvement in the manner of supporting long or slender logs on the carriages of sawmills by means of an apparatus which I denominate the "self-adjusting log-brace;" and I do hereby declare that the following is a full and exact description thereof.

My log brace consists of a shaft supported on gudgeons, and crossing the floor of the mill beneath the carriage, at a short distance in front of the saw; said shaft having standards mortised into it which support a friction roller, intended to sustain the log while being sawed. From this shaft there also extends an arm by which the shaft and roller are held in place, and which arm is raised, and the roller lowered, as the rear end of the log approaches the saw.

In the accompanying drawing, I have represented such part of the floor and carriage of a saw mill as are necessary to show the nature of my invention.

A, A, is the floor of the mill, and B, B, the carriage. C, is the shaft crossing the floor of the mill.

D, D, are standards that support the friction roller E, by which the log is to be sustained when brought up against it as it would be in the position represented in the drawing. From one end of the shaft C, an arm F, extends back, and when this lies horizontally the roller E, is in contact with the log; but when it is raised vertically, the roller is depressed, and brought even with the floor. The arm F, is held down by means of a link, or catch, G, on its end, and which is passed over a pin in one of the floor-beams.

H, is a piece of iron projecting from the carriage, and so situated as that it will be brought, by the advancing of the carriage, into contact with the link G, which it will relieve from its hold on the pin and leave the shaft C, free to revolve. When the tail block comes into contact with the roller E, it will depress it, and raise the arm F, and the rear end of the log will thus be left free to advance unobstructedly to the saw. There may, if required, be more than one shaft and its appurtenances employed under the same carriage.

What I claim as constituting my invention in the within described improvement in saw mills, is—

The manner of using the shaft C, carrying the friction roller E, for supporting logs on saw mills; the several parts connected therewith being combined together, and operating in combination with the carriage substantially in the manner herein set forth.

In testimony whereof, I have hereunto set my hand this twenty second day of June, one thousand, eighteen hundred, and fifty.

BENJN. CUSHWA.

Witnesses:
   THOS. P. JONES,
   B. K. MORSELL.